US011290459B2

(12) United States Patent
Alcorn et al.

(10) Patent No.: US 11,290,459 B2
(45) Date of Patent: Mar. 29, 2022

(54) GRANTING GUEST DEVICES ACCESS TO A NETWORK USING OUT-OF-BAND AUTHORIZATION

(71) Applicant: LENOVO ENTERPRISE SOLUTIONS (SINGAPORE) PTE. LTD., Singapore (SG)

(72) Inventors: Matthew R. Alcorn, Durham, NC (US); James G. McLean, Raleigh, NC (US); Dharmesh N. Topiwala, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 15/980,507

(22) Filed: May 15, 2018

(65) Prior Publication Data

US 2019/0356668 A1    Nov. 21, 2019

(51) Int. Cl.
*H04L 29/06* (2006.01)
*H04W 12/08* (2021.01)
*H04L 9/32* (2006.01)

(52) U.S. Cl.
CPC .......... *H04L 63/102* (2013.01); *H04L 9/3226* (2013.01); *H04L 63/0492* (2013.01); *H04L 63/107* (2013.01); *H04L 63/108* (2013.01); *H04W 12/08* (2013.01); *H04L 63/0428* (2013.01)

(58) Field of Classification Search
CPC . H04L 63/102; H04L 9/3226; H04L 63/0492; H04L 63/107; H04L 63/108; H04L 63/0428; H04W 12/08

USPC .............................................................. 726/4
See application file for complete search history.

(56) References Cited

U.S. PATENT DOCUMENTS

| 8,528,059 B1 * | 9/2013 | Labana | .................. | H04L 63/08 |
| | | | | 726/5 |
| 9,674,187 B1 * | 6/2017 | Ngo | ...................... | H04W 12/06 |
| 9,860,279 B2 * | 1/2018 | Jain | ........................ | H04L 61/256 |

(Continued)

OTHER PUBLICATIONS

Chorus: scalable in-band trust establishment for multiple constrained devices over the insecure wireless channel Yantian Hou, Ming Li, Joshua D. Guttman WiSec '13: Proceedings of the sixth ACM conference on Security and privacy in wireless and mobile networks. Apr. 2013, pp. 167-178. (Year: 2013).*

(Continued)

*Primary Examiner* — Samson B Lemma
*Assistant Examiner* — Mohammad S Shams

(57) ABSTRACT

Granting guest devices access to a network using out-of-band authorization including receiving, over an out-of-band network, a password for an in-band network from a guest device, wherein the password is generated on the guest device; storing the password received over the out-of-band network as an authorized password for the in-band network; receiving, from the guest device using an in-band protocol, a request to join the in-band network, wherein the request to join the in-band network comprises the password previously received from the guest device over the out-of-band network; and granting the guest device access to the in-band network based on a determination that the password received in the request to join the in-band network matches the password previously received from the guest device over the out-of-band network.

18 Claims, 7 Drawing Sheets

(56) References Cited

U.S. PATENT DOCUMENTS

| | | | |
|---|---|---|---|
| 9,923,896 B2* | 3/2018 | Rengan | H04L 63/107 |
| 9,923,927 B1* | 3/2018 | McClintock | H04L 63/20 |
| 10,057,022 B2* | 8/2018 | Yoganathan | H04L 67/12 |
| 2004/0015724 A1* | 1/2004 | Pham | H04L 63/12 |
| | | | 713/179 |
| 2006/0041755 A1* | 2/2006 | Pemmaraju | G06F 21/32 |
| | | | 713/182 |
| 2006/0053276 A1* | 3/2006 | Lortz | H04L 63/105 |
| | | | 713/2 |
| 2009/0210912 A1* | 8/2009 | Cholas | H04N 21/4263 |
| | | | 725/82 |
| 2013/0309971 A1* | 11/2013 | Kiukkonen | H04L 63/107 |
| | | | 455/41.2 |
| 2014/0040451 A1* | 2/2014 | Agrawal | H04L 47/32 |
| | | | 709/224 |
| 2015/0050879 A1* | 2/2015 | MacDuff | H04B 5/0056 |
| | | | 455/39 |
| 2015/0223068 A1* | 8/2015 | Thelen | H04W 12/069 |
| | | | 726/7 |
| 2016/0072823 A1* | 3/2016 | Faccin | H04W 88/06 |
| | | | 726/1 |
| 2016/0119284 A1* | 4/2016 | Kim | H04L 63/0876 |
| | | | 726/12 |
| 2016/0149881 A1* | 5/2016 | Rengan | H04L 63/107 |
| | | | 726/7 |
| 2016/0277446 A1* | 9/2016 | Kumar | H04L 63/20 |
| 2017/0093536 A1* | 3/2017 | Yoganathan | H04L 67/12 |
| 2017/0111328 A1* | 4/2017 | Leon | H04L 9/30 |
| 2017/0187703 A1* | 6/2017 | Enrique Salpico | H04L 63/1458 |
| 2017/0244760 A1* | 8/2017 | Prasad | H04L 63/20 |
| 2017/0316185 A1* | 11/2017 | Park | H04L 67/306 |
| 2017/0346830 A1* | 11/2017 | Goldfarb | H04L 67/20 |
| 2018/0018184 A1* | 1/2018 | Durnov | H04W 4/14 |
| 2018/0262503 A1* | 9/2018 | Dawson | H04L 63/0884 |
| 2019/0182243 A1* | 6/2019 | Tjahjono | H04W 12/06 |

OTHER PUBLICATIONS

Securing Wireless Neurostimulators Eduard Marin, Dave Singelee, Bohan Yang, Vladimir Volski, Guy A.E. Vandenbosch, Bart Nuttin, Bart Preneel CODASPY '18: Proceedings of the Eighth ACM Conference on Data and Application Security and Privacy. Mar. 2018, pp. 287-298. (Year: 2018).*

* cited by examiner

GRANTING GUEST DEVICES ACCESS TO A NETWORK USING OUT-OF-BAND AUTHORIZATION

BACKGROUND

Field of the Invention

The field of the invention is data processing, or, more specifically, methods, apparatus, and products for granting guest devices access to a network using out-of-band authorization.

Description of Related Art

Home and business networks, including Wi-Fi networks, are ubiquitous. Frequently, houseguests, visitors, and workman desire temporary access to these networks. However, providing access comes with security risks. For example, persistent guest networks may be given limited privileges. Despite the limited privileges, the same password must still be given out to all users, and the password may remain stored on previous guest's devices. If a previous guest's device is compromised, the password may be used by an entity that the network administrator did not intend to give access.

SUMMARY

Methods, systems, and apparatus for granting guest devices access to a network using out-of-band authorization are disclosed in this specification. Granting guest devices access to a network using out-of-band authorization includes receiving, over an out-of-band network, a password for an in-band network from a guest device, wherein the password is generated on the guest device; storing the password received over the out-of-band network as an authorized password for the in-band network; receiving, from the guest device using an in-band protocol, a request to join the in-band network, wherein the request to join the in-band network comprises the password previously received from the guest device over the out-of-band network; and granting the guest device access to the in-band network based on a determination that the password received in the request to join the in-band network matches the password previously received from the guest device over the out-of-band network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
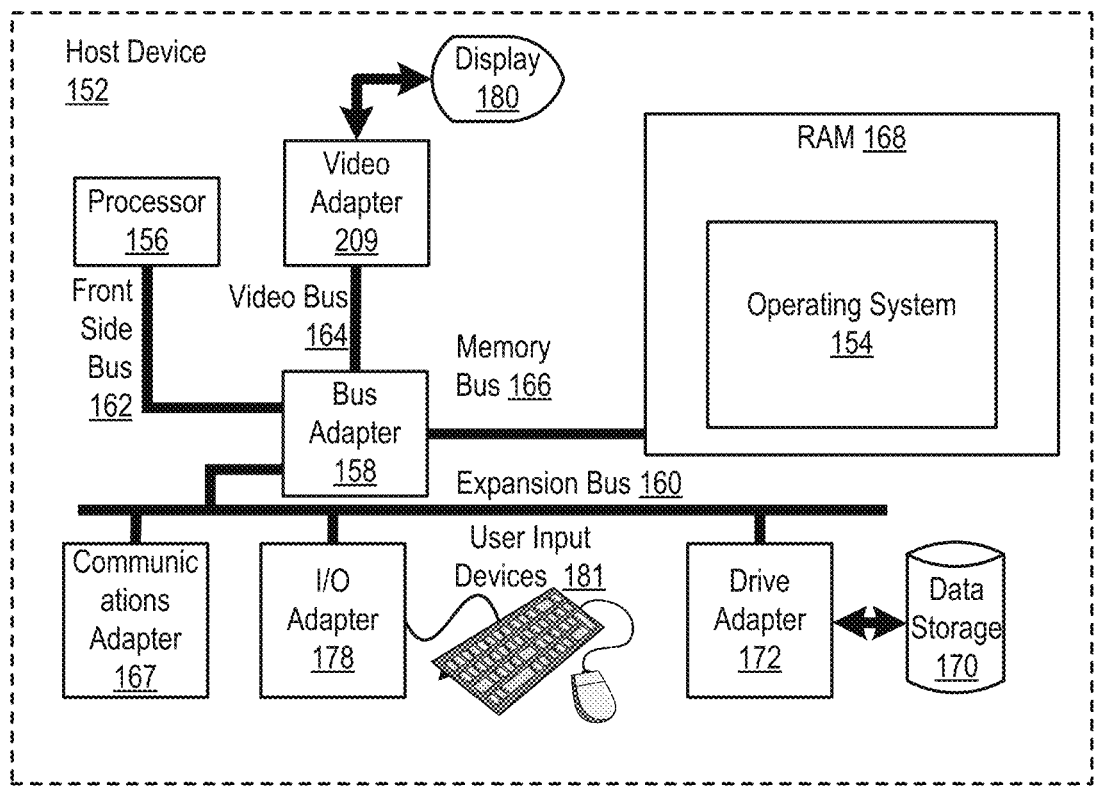
FIG. 1 sets forth a block diagram of an example system configured for granting guest devices access to a network using out-of-band authorization according to embodiments of the present invention.

Exemplary methods, apparatus, and products for granting guest devices access to a network using out-of-band authorization in accordance with the present invention are described with reference to the accompanying drawings, beginning with FIG. 1. FIG. 1 sets forth a block diagram of automated computing machinery comprising an exemplary host device (152) configured for granting guest devices access to a network using out-of-band authorization according to embodiments of the present invention. The host device (152) of FIG. 1 includes at least one computer processor (156) or 'CPU' as well as random access memory (168) ('RAM') which is connected through a high speed memory bus (166) and bus adapter (158) to processor (156) and to other components of the host device (152).

Stored in RAM (168) is an operating system (154). Operating systems useful in computers configured for granting guest devices access to a network using out-of-band authorization according to embodiments of the present invention include UNIX™, Linux™ Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The host device (152) of FIG. 1 includes disk drive adapter (172) coupled through expansion bus (160) and bus adapter (158) to processor (156) and other components of the host device (152). Disk drive adapter (172) connects non-volatile data storage to the host device (152) in the form of data storage (170). Disk drive adapters useful in computers configured for granting guest devices access to a network using out-of-band authorization according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example host device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary host device (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for granting guest devices access to a network using out-of-band authorization according to embodiments of the present invention include modems for wired dial-up communications, Ethernet (IEEE 802.3) adapters for wired data communications, and 802.11 adapters for wireless data communications.

Figure 2:
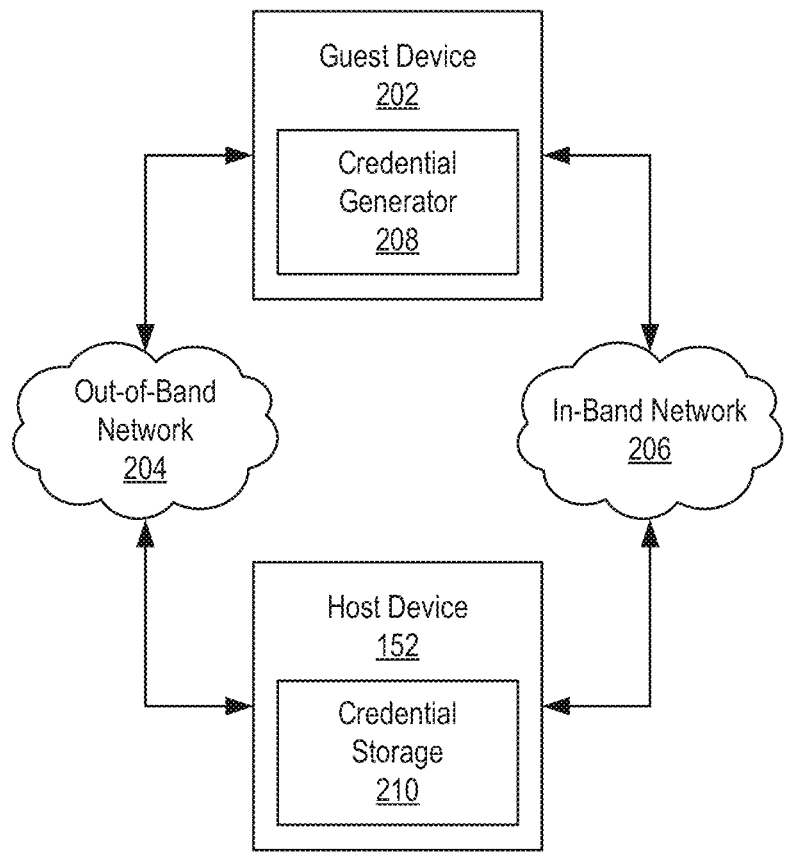
FIG. 2 sets forth a block diagram of an example system configured for granting guest devices access to a network using out-of-band authorization according to embodiments of the present invention.

FIG. 2 shows an exemplary system for granting guest devices access to a network using out-of-band authorization according to embodiments of the present invention. As shown in FIG. 2, the exemplary system includes a guest device (202) and a host device (152), each coupled to an out-of-band network (204) and an in-band network (206). The guest device (202) includes a credential generator (208) and the host device (152) includes credential storage (210).

The guest device (202) is a device attempting to gain access to the in-band network (206). The guest device (202) may be a computing device such as a laptop computer, desktop computer, smartphone, tablet, or smart watch. The guest device (202) may include one network interface controller to communicate over the in-band network (206), and another network interface controller to communicate over the out-of-band network (204). Each network interface controller may include an antenna, such as a Wi-Fi, Bluetooth, radio, or near field communication (NFC) antenna.

Instead of a network interface controller and antenna, the guest device (202) may communicate over the out-of-band network (204) using visual or light-based communication, such as infrared (IR) signals sent and/or received from the host device (152). Further, the guest device (202) may communicate over the out-of-band network (204) using one-way light-based or visual communication. For example, the guest device (202) may generate and present an image on the screen of the guest device (202) that is read by a camera on the host device (152).

The credential generator (208) is an aggregation of hardware and software on the guest device (202) that generates a password for later access to the in-band network (206). The credential generator (208) may also generate a network attributes definition for the in-band network (206). The password and/or the network name within network attributes definition may be generated by the credential generator (208) using an arbitrary or pre-determined string of characters. Alternatively, the password and/or the network attributes definition may be generated by the credential generator (208) using inputs from the guest device (202) and/or the host device (152). For example, an eight-character password may be generated using four random characters selected by the credential generator (208) and four other characters received from the host device (152). As another example, the network name may be generated using all or part of a media access controller (MAC) address of the Wi-Fi antenna on the guest device (202).

The credential generator (208) may also prepare the password (and other data) for transmission on the out-of-band network (204) to the host device (152). The credential generator (208) may encrypt the password (e.g., using an encryption key provided by the host device (152)) before it is transmitted on the out-of-band network (204) to the host device (152). Further, the credential generator (208) may also generate a visual presentation (e.g., a quick response (QR) code) of the password for reading by the host device. The credential generator (208) may be a component of an application running on the guest device (202).

The host device (152) is a device that controls access to the in-band network (206). The host device (152) may be a networking router or gateway. The host device (152) may include one network interface controller to communicate over the in-band network (206), and another network interface controller to communicate over the out-of-band network (204). Each network interface controller may include an antenna, such as a Wi-Fi, Bluetooth, radio, or NFC antenna.

Instead of a network interface controller and antenna, the host device (152) may communicate over the out-of-band network (204) using visual or light-based communication, such as infrared signals sent and/or received from the guest device (202). Further, the host device (152) may communicate over the out-of-band network (204) using one-way visual or light-based communication. For example, host device (152) may include a camera configured to read an image on the screen of the guest device (202).

The credential storage (210) is an aggregation of hardware and software on the host device (152) that stores credentials for the in-band network (206) received over the out-of-band network (204). The credential storage (210) may store an association between a password and an in-band network. The credential storage (210) may also store identifying information for the guest device (202) (e.g., a MAC address of the in-band network antenna of the guest device (202)) and identifying information about a user of the guest device (202) (e.g., name, phone number, employee ID). The credential storage (210) may also store limitations on the authorization of the password and guest device (202). For example, the credential storage (210) may store an expiration time of the password, a range limitation on the use of the password, a communication timeout period for the password, and a data threshold for the guest device (202) using the password.

The out-of-band network (204) is a communications medium over which a password is transmitted from the guest device (202) to the host device (152). The term "out-of-band" refers to a communication path that bypasses one or more other networks between the guest device (202) and the host device (152). An out-of-band network may bypass a main (i.e., in-band) network between the host device (152) and the guest device (202). The out-of-band network (204) may be a direct connection between the guest device (202) and the host device (152). Further, the out-of-band network (204) may support only one-way communication (e. g., the guest device (202) transmits data but does not receive data, the host device (152) receives data but does not transmit data). The out-of-band network (204) may be, for example, a Bluetooth connection, a NFC connection, an infrared connection, or a camera on the host device (152) reading the screen of the guest device (202).

The out-of-band network (204) utilizes an out-of-band protocol. The out-of-band protocol is the form of data sent on the out-of-band network (204) and the manner by which the data is sent on the out-of-band network (204). The out-of-band protocol may be a limited-range protocol. The out-of-band protocol may include, for example, a Bluetooth protocol, an NFC protocol, a Wi-Fi protocol, or a visual code such as a QR code. A guest device (202) may be authorized to access the out-of-band network (204) based on a proximity to the host device (152) or out-of-band network terminal for the host device (152). For example, the host device (152) may allow any guest device (202) within Bluetooth or NFC range to communicate with the host device (152) over the out-of-band network (204).

The in-band network (206) is a communications network that may be used by the guest device (202) to access a local area network or wide area network (such as the Internet). The in-band network (206) may be, for example, a Wi-Fi network, an ethernet network, a Bluetooth network, or a high-speed radio network (i.e., Long-Term Evolution (LTE) network). Access to the in-band network may be controlled, in part, by the host device (152).

The in-band network (206) utilizes an in-band protocol. The in-band protocol is the form of data sent on the in-band network (206) and the manner by which the data is sent on the in-band network (206). The in-band protocol may include, for example, a Wi-Fi protocol, an ethernet protocol, a Bluetooth protocol, or a high-speed radio protocol (i.e., LTE protocol). The in-band protocol may also be used to gain access to the in-band network (206). Specifically, the host device (152) may receive a request to join the in-band network (206) that utilizes the in-band protocol. The in-band protocol may be incompatible with the out-of-band network (204) and the out-of-band protocol may be incompatible with the in-band network (206).

Figure 3:
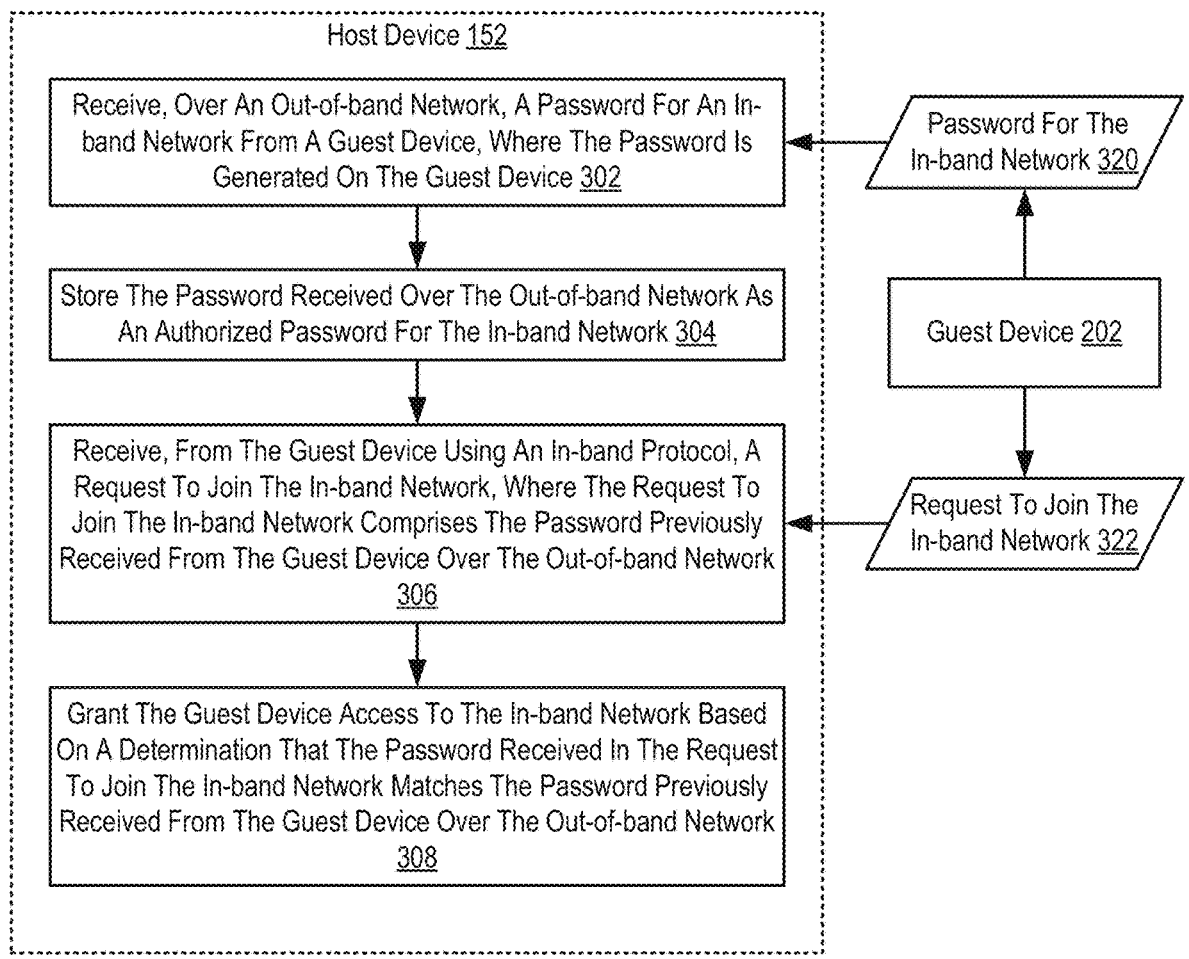
FIG. 3 sets forth a flow chart illustrating an exemplary method for granting guest devices access to a network using out-of-band authorization according to embodiments of the present invention.

For further explanation, FIG. 3 sets forth a flow chart illustrating an exemplary method for granting guest devices access to a network using out-of-band authorization according to embodiments of the present invention that includes receiving (302), over an out-of-band network, a password (320) for an in-band network from a guest device (202), wherein the password is generated on the guest device (202). Receiving (302), over an out-of-band network, a password (320) for an in-band network from a guest device (202), wherein the password is generated on the guest device (202) may be carried out by the guest device (202) establishing a connection over the out-of-band network and transferring the password (320) over the out-of-band network.

For example, the out-of-band network may be a Bluetooth connection. The guest device (202) may attempt to pair with the host device (152) using the Bluetooth protocol. Once the pairing procedure is successful, the guest device (202) may initiate a data transfer to the host device (152) of data that contains the password (320) for an in-band network. Once the transfer is complete, the Bluetooth connection may be terminated.

As another example, the out-of-band network may be an NFC connection. The guest device (202) may initiate a NFC handshake process with the host device (152) once the guest device (202) is within range of the NFC hotspot coupled to the host device (152). Once the NFC connection is established, the guest device (202) may initiate a data transfer to the host device (152) of data that contains the password (320) for an in-band network. Once the transfer is complete, the NFC connection may be terminated.

As another example, the out-of-band network may be an IR connection. The guest device (202) may initiate an IR handshake process with the host device (152) once the guest device (202) is within visual range of the IR receiver and transmitter for the host device (152). Once the IR connection is established, the guest device (202) may initiate a data transfer to the host device (152) for data that contains the password (320) for an in-band network. Once the transfer is complete, the IR connection may be terminated.

Finally, as another example, the out-of-band network may include a camera on the host device (152) detecting a QR code displayed on the screen of the guest device (202). The guest device (202) may generate a QR code containing a password for the in-band network. The host device (152) may decode the QR code to obtain the password (320) for an in-band network.

Generating the password by the guest device (202) may be carried out by the guest device (202) creating the password based on at least one password generation rule. A password generation rule is an instruction that dictates the form and content of the password. For example, the password generation rule may instruct the guest device (202) that the password must be compliant with the WiFi protected access protocol. Password generation rules may be received over the out-of-band network from the host device (152) prior to the guest device (202) sending the password to the host device (152).

The password (320) need not be authorized or known to the host device (152) prior to sending the password (320) to the host device (152). The password (320) may become an authorized password for accessing the in-band network based on the password (320) having been transferred to the host device (152) over the out-of-band network.

The method of FIG. 3 further includes storing (304) the password (320) received over the out-of-band network as an authorized password for the in-band network. Storing (304) the password (320) received over the out-of-band network as an authorized password for the in-band network may be carried out by the host device storing the password (320) in credential storage for later comparison to passwords received for access to the in-band network.

Having received the password (320) over the out-of-band network may be sufficient to authorize access to the in-band network for the guest device (202) using the password (320). Alternatively, the host device (152) may also verify that the password satisfies password generation rules. Further, the host device (152) may validate information received with the password (320) over the out-of-band network to determine if the guest device (202) is authorized to access the in-band network. Such information may include, for example, a personal identification number, employee ID, or username.

As an alternative to receiving (302), over an out-of-band network, a password (320) for an in-band network from a guest device (202) and storing (304) the password (320) received over the out-of-band network as an authorized password for the in-band network, the host device (152) may generate the password and transmit the password over the out-of-band network to the guest device (202).

The method of FIG. 3 further includes receiving (306), from the guest device (202) using an in-band protocol, a request (322) to join the in-band network, wherein the request (322) to join the in-band network comprises the password previously received from the guest device (202) over the out-of-band network. Receiving (306), from the guest device (202) using an in-band protocol, a request (322) to join the in-band network, wherein the request (322) to join the in-band network comprises the password previously received from the guest device (202) over the out-of-band network may be carried out by the host device (152) receiving the request (322) and password (320) using an in-band protocol for requesting access to the in-band network. For example, the request (322) to join the in-band network may be a request to join a Wi-Fi network received using the Wi-Fi protocol.

The request (322) includes the password (320) previously received from the guest device (202) over the out-of-band network. For example, the password may be the same alphanumeric string received over the out-of-band network. The request (322) may include a combination of the password and a password addition, and the combination of the password and password addition may be required to gain access to the in-band network.

The method of FIG. 3 further includes granting (308) the guest device (202) access to the in-band network based on a determination that the password received in the request (322) to join the in-band network matches the password (320) previously received from the guest device (202) over the out-of-band network. Determining that the password received in the request (322) to join the in-band network matches the password (320) previously received from the guest device (202) over the out-of-band network may be carried out by the host device (152) comparing the password received in the request (322) to the password (320) previously received from the guest device (202) over the out-of-band network. The password (320) previously received from the guest device (202) over the out-of-band network may be a version of the password that was stored as an authorized password. For example, the password (320) previously received from the guest device (202) over the out-of-band network may include a password addition.

Granting (308) the guest device (202) access to the in-band network may be carried out by authorizing the guest device (202) to join the in-band network. Once the guest device (202) has been granted access to the in-band network, the guest device (202) may send and receive data from other devices with access to the same in-band network.

Access may be granted to the guest device (202) based only on the receipt of the request (322) that includes the password (320) previously received from the guest device (202) over the out-of-band network. Alternatively, additional criteria must be met to grant access to the guest device (202). For example, the host device (152) may require that the password has not yet been deauthorized. The host device (152) may also require that the guest device (202) characteristics match characteristics stored with password, such as a MAC address.

As an example of the steps described above, a guest with a smart phone may desire to join the Wi-Fi network of a coffee shop. The guest may walk up to a host router in the coffee shop and an application on the guest's smartphone may generate the password "123 secret". The guest may hold the smartphone near an NFC hotspot on the host router. Upon detection of the NFC connection, the smartphone may send the password "123 secret" to the host router over the NFC connection. The host router receives the password "123secret" from the smartphone and stores the password as an authorized password for the Wi-Fi network. Once the NFC transfer is confirmed, the smartphone may attempt to connect to the Wi-Fi network using the password "123 secret". The host router receives, using the Wi-Fi protocol, the request to join the Wi-Fi network that includes the password "123 secret". The host router compares the password received in the request to join the Wi-Fi network ("123 secret") with the stored authorized password ("123 secret") and determines that the passwords match. In response, the host router grants the smartphone access to the Wi-Fi network at the coffeeshop.

The above-described steps improve the operation of a computing system by authorizing a network device based, at least in part, on that device's ability to access a second network. The above-described steps are a specific improvement in how computers carry out one of their basic functions, specifically authorizing devices on computer networks. This is accomplished by receiving a password from the device over the second (i.e., out-of-band network), storing that password as an authorized password, receiving a request to join the first network (i.e., the in-band network) that includes the same password received over the second network, and granting access to the first network based on receiving the password previously received over the second network.

Figure 4:
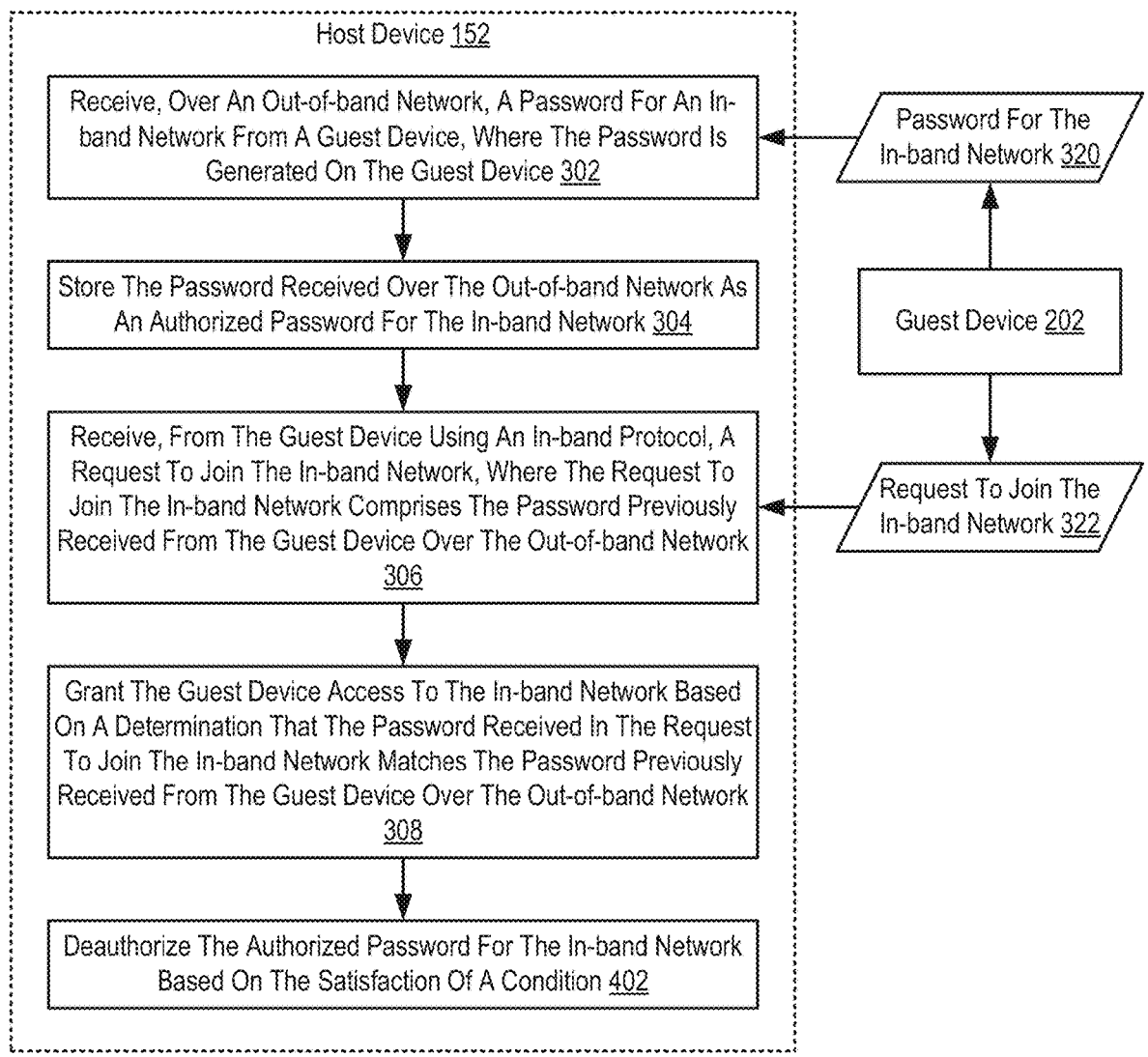
FIG. 4 sets forth a flow chart illustrating an exemplary method for granting guest devices access to a network using out-of-band authorization according to embodiments of the present invention.

For further explanation, FIG. 4 sets forth a flow chart illustrating a further exemplary method for granting guest devices access to a network using out-of-band authorization according to embodiments of the present invention that includes receiving (302), over an out-of-band network, a password (320) for an in-band network from a guest device (202), wherein the password is generated on the guest device (202); storing (304) the password (320) received over the out-of-band network as an authorized password for the in-band network; receiving (306), from the guest device (202) using an in-band protocol, a request (322) to join the in-band network, wherein the request (322) to join the in-band network comprises the password previously received from the guest device (202) over the out-of-band network; and granting (308) the guest device (202) access to the in-band network based on a determination that the password received in the request (322) to join the in-band network matches the password (320) previously received from the guest device (202) over the out-of-band network.

The method of FIG. 4 differs from the method of FIG. 3, however, in that the method of FIG. 4 further includes deauthorizing (402) the authorized password for the in-band network based on the satisfaction of a condition. Deauthorizing (402) the authorized password for the in-band network may be carried out by deleting or otherwise removing the password or other credentials stored on the host device (152). Once the password is deauthorized, if the guest device (202) requests to join the in-band network using the deauthorized password, the host device (152) will deny access to the in-band network.

The conditions causing deauthorization of the password include a determination that the guest device is out of range of the in-band network; a determination that a pre-determined period of time has elapsed with no communication from the guest device over the in-band network; a determination that a time period has expired; and a determination that an amount of data used by the guest device over the in-band network has exceeded a data threshold.

Determining that the guest device is out of range of the in-band network may be carried out by monitoring a distance between the guest device and the host device and determining that the distance has exceeded a distance threshold. Determining that the guest device is out of range of the in-band network may also be carried out by determining that data sent and received between the host device (or host device extension) and the guest device is expressing degradation consistent with transmission over a distance too great to support clear transmission. A sequence of degraded data packets followed by no transmissions at all may cause the host device (152) to determine that the guest device is out of range of the in-band network.

Determining that a pre-determined period of time has elapsed with no communication from the guest device over the in-band network may be carried out by monitoring a timer between each data packet sent by the guest device and determining whether the timer has reached a timing parameter. If the timer reaches the timing parameter, then the host device (152) may determine that the pre-determined period of time has elapsed with no communication from the guest device over the in-band network.

Determining that a time period has expired may be carried out by the host device (152) monitoring a timer that began as the guest device was first granted access to the in-band network. Once the timer has reaches a certain timing parameter (e.g., zero for a countdown timer), the host device (152) may determine that a time period has expired.

Determining that an amount of data used by the guest device over the in-band network has exceeded a data threshold may be carried out by the host device (152) monitoring the amount of data downloaded and/or uploaded by the guest device (202) on the in-band network. At regular intervals, the host device (152) may compare the amount of data downloaded and/or uploaded by the guest device (202) to the data threshold. If the amount of data downloaded and/or uploaded by the guest device (202) is greater than the data threshold, then the host device (152) may determine that the amount of data used by the guest device over the in-band network has exceeded a data threshold.

Deauthorizing (402) the authorized password for the in-band network may also be carried out by deleting or removing the in-band network. Specifically, the in-band network may have been created for the guest device (202), and once the authorized password for guest device has been deauthorized based on a satisfied condition, the in-band network may be deleted or removed from the host device.

The in-band network may be created by the host device (152) as a temporary network for use exclusively by the guest device (202). Accordingly, once the host device (152) determines that the guest device (202) is no longer authorized to access the in-band network, the host device (152) may shut down the in-band network in addition to deauthorizing the password. Once the password is deauthorized and the in-band network shut down, information about the password and in-band network as defined by the guest device (202) are deleted and not re-used. Deleting the network information provided by the guest device (202) provides security to the user of the guest device (202) because after a particular connection session ends, any information kept on the host device (152) cannot be used to compromise the guest device (202).

Figure 5:
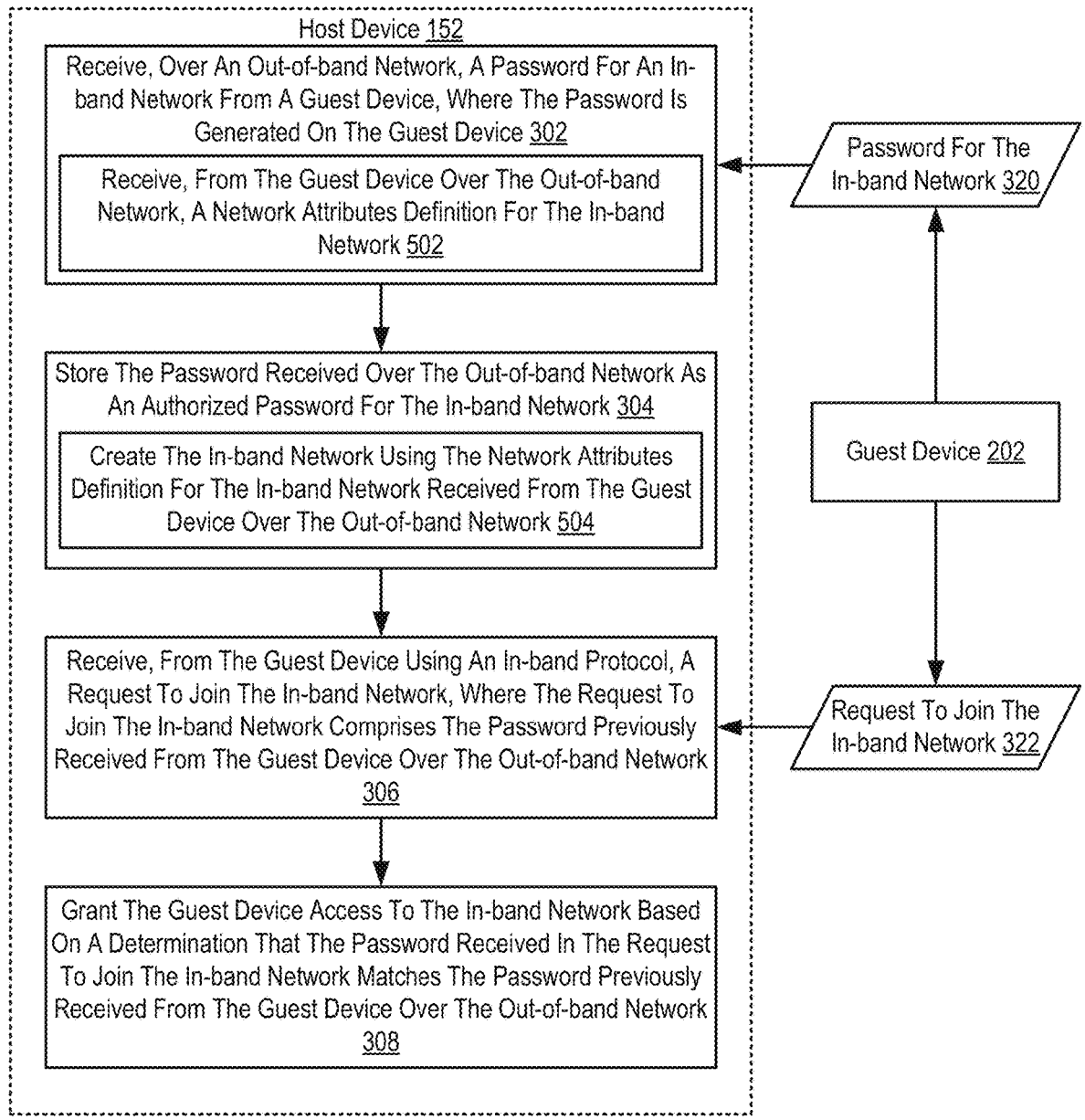
FIG. 5 sets forth a flow chart illustrating an exemplary method for granting guest devices access to a network using out-of-band authorization according to embodiments of the present invention.

For further explanation, FIG. 5 sets forth a flow chart illustrating a further exemplary method for granting guest devices access to a network using out-of-band authorization according to embodiments of the present invention that includes receiving (302), over an out-of-band network, a password (320) for an in-band network from a guest device (202), wherein the password is generated on the guest device (202); storing (304) the password (320) received over the out-of-band network as an authorized password for the in-band network; receiving (306), from the guest device (202) using an in-band protocol, a request (322) to join the in-band network, wherein the request (322) to join the in-band network comprises the password previously received from the guest device (202) over the out-of-band network; and granting (308) the guest device (202) access to the in-band network based on a determination that the password received in the request (322) to join the in-band network matches the password (320) previously received from the guest device (202) over the out-of-band network.

The method of FIG. 5 differs from the method of FIG. 3, however, in that receiving (302), over an out-of-band network, a password (320) for an in-band network from a guest device (202), wherein the password is generated on the guest device (202) includes receiving (502), from the guest device over the out-of-band network, a network attributes definition for the in-band network. Receiving (502), from the guest device over the out-of-band network, a network attributes definition for the in-band network may be carried out by the host device (152) receiving data over the out-of-band network that includes both the password (320) and a proposed network attributes definition for the in-band network. For example, the guest device (202) may send a network attributes definition that includes the name of the network (such as a service set identifier (SSID)) with the password sent on the out-of-band network.

The network name within the network attributes definition for the in-band network may be subject to one or more name generation rules. For example, the host device (152) may require that the name be a valid SSID name. As another example, the host device (152) may require that the name include a specified identifier of the guest device, such as a MAC address of the Wi-Fi antenna. As yet another example, the host device (152) may require that the name not match the name of any existing in-band networks currently in use. If the name does not satisfy each name generation rule, the host device (152) may reject the name by sending a rejection message to the guest device over the out-of-band network.

The method of FIG. 5 also differs from the method of FIG. 3 in that storing (304) the password (320) received over the out-of-band network as an authorized password for the in-band network includes creating (504) the in-band network using the network attributes definition for the in-band network received from the guest device over the out-of-band network. Creating (504) the in-band network using the network attributes definition for the in-band network received from the guest device over the out-of-band network may be carried out by initializing a new in-band network with a name or other identifier that matches a name received in the network attributes definition from the guest device (202).

For example, the host device (152) may receive, over the out-of-band network, a network attributes definition that includes "guestSSID" as the name of the in-band network and "123secret" as the password. In response, the host device (152) may create new Wi-Fi network with an SSID of "guestSSID" with a password of "123 secret". Once the password for the "guestSSID" is deauthorized, the host device may remove the "guestSSID" network from the host device.

The network attributes definition for in-band network received by the host device (152) may include other network settings for the in-band network in addition to a name for the in-band network. Such network settings may include, for example, whether or not the network name (e.g., an SSID) is visible, the type of password encryption used for the password, the channel of the in-band network, and the frequency of the in-band network. Similar to the above example, in addition to receiving, over the out-of-band network from the guest device (202), the network name "guestSSID" as the name of the in-band network and "123 secret" as the password, the host device (152) may also receive an indication that "guestSSID" should be hidden, that the password should use WPA-Pre-Shared Key encryption, and that the in-band network should use channel 11.

Figure 6:
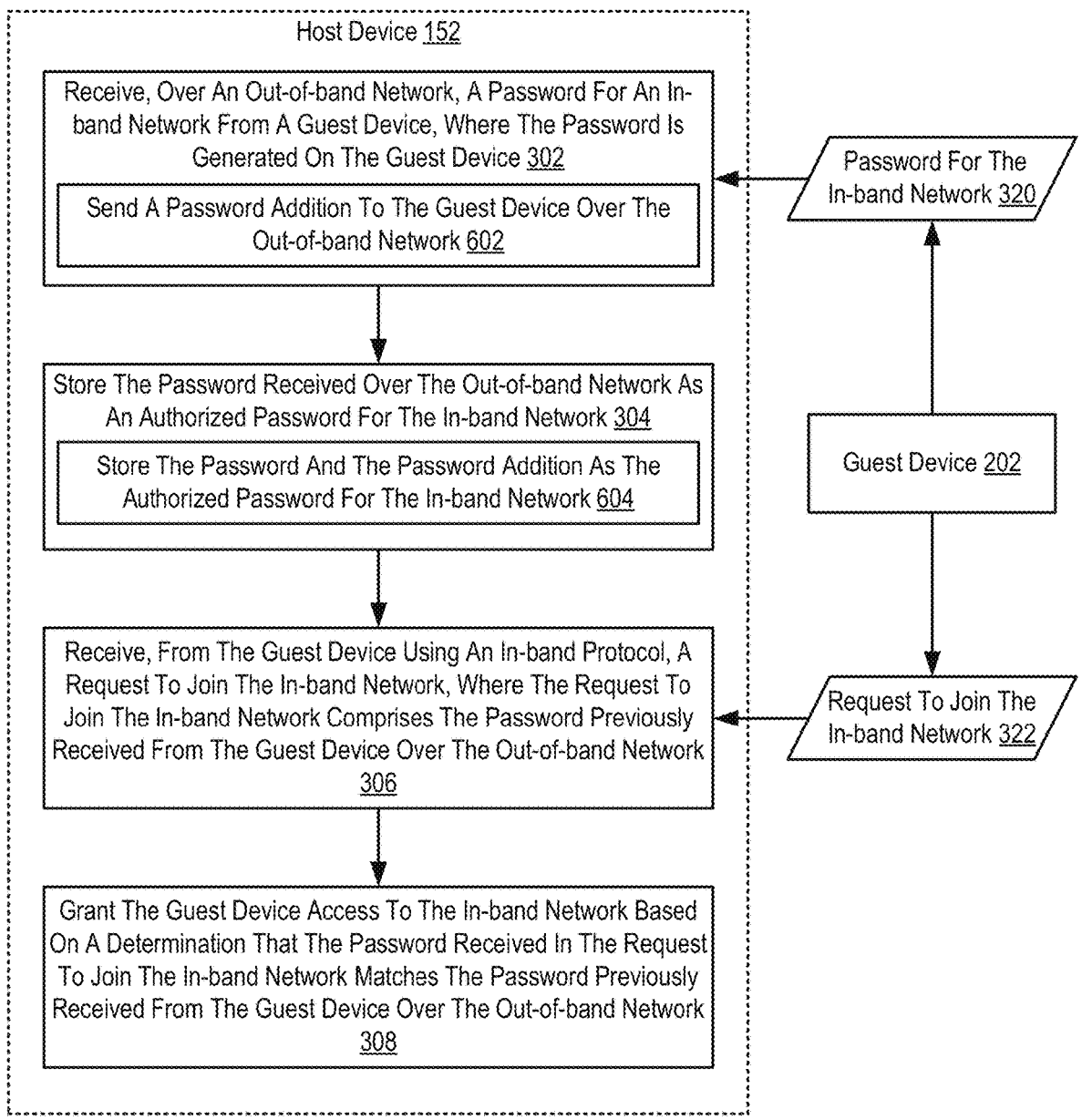
FIG. 6 sets forth a flow chart illustrating an exemplary method for granting guest devices access to a network using out-of-band authorization according to embodiments of the present invention.

For further explanation, FIG. 6 sets forth a flow chart illustrating a further exemplary method for granting guest devices access to a network using out-of-band authorization according to embodiments of the present invention that includes receiving (302), over an out-of-band network, a password (320) for an in-band network from a guest device (202), wherein the password is generated on the guest device (202); storing (304) the password (320) received over the out-of-band network as an authorized password for the in-band network; receiving (306), from the guest device (202) using an in-band protocol, a request (322) to join the in-band network, wherein the request (322) to join the in-band network comprises the password previously received from the guest device (202) over the out-of-band network; and granting (308) the guest device (202) access to the in-band network based on a determination that the password received in the request (322) to join the in-band network matches the password (320) previously received from the guest device (202) over the out-of-band network.

The method of FIG. 6 differs from the method of FIG. 3, however, in that receiving (302), over an out-of-band network, a password (320) for an in-band network from a guest device (202), wherein the password is generated on the guest device (202) includes sending (602) a password addition to the guest device (202) over the out-of-band network. Sending (602) a password addition to the guest device (202) over the out-of-band network may be carried out by the host device (152) retrieving or generating the password addition and generating a message that includes the password addition. A password addition may be a string of text to be added to the password (320) to generate an authorized password. The password addition may include identifying information for the guest device (202) or host device (152).

The message from the host device (152) that includes the password addition may not include the password. Similarly, the message from the guest device (202) that includes the password may not include the password addition. Sending (602) a password addition to the guest device (202) may be done before or after receiving the password (320) for the in-band network from the guest device.

Sending (602) the password addition to the guest device (202) may also include sending instructions to the guest device (202) regarding the manner in which the password and password addition are to be combined. For example, the message including the password addition may instruct the guest device (202) to append the password addition to the end of the password to generate the authorized password.

The method of FIG. 6 also differs from the method of FIG. 3 in that storing (304) the password (320) received over the out-of-band network as an authorized password for the in-band network includes storing (604) the password and the password addition as the authorized password for the in-band network. Storing (604) the password and the password addition as the authorized password for the in-band network may be carried out by the host device combining the password and the password addition in a default manner or the manner described in the password addition message to the guest device (202).

For example, the host device (152) may receive the password "123 secret" from the guest device (202) over the out-of-band network. In response to receiving the password, the host device (152) may send, to the guest device (202), the password addition "456secure". Both the guest device (202) and the host device (152) are configured to generate the authorized password by appending the password addition to the end of the password. The host device (152) stores the combination password and password addition "123secret456secure" as the authorized password for the in-band network. This process prevents the authorized password from being transmitted in its entirety in any given message between the host device (152) and the guest device (202).

The guest device (202) and the host device (152) may also collaborate on a name of the in-band network. Specifically, the guest device (202) may send the host device (152) a first portion of the name of the in-band network, and the host device (152) may send the guest device (202) a second portion of the name of the in-band network. Both the guest device (202) and the host device (152) may store the name of the in-band network as a combination of the first portion and the second portion.

For example, the host device (152) may receive, from the guest device (202) over the out-of-band network, "guestNET" as the first portion of the SSID for the in-band network. In response to receiving "guestNET", the host device (152) may send, to the guest device (202), "hostNET" as the second portion of the SSID for the in-band network. Both the guest device (202) and the host device (152) are configured to generate the SSID of the in-band network by appending the second portion to the end of the first portion. The host device (152) and the guest device (202) store the SSID of the in-band network as "guestNEThostNET". Similar to the previous example, this process prevents the SSID from being transmitted in its entirety in any given message between the host device (152) and the guest device (202).

Figure 7:
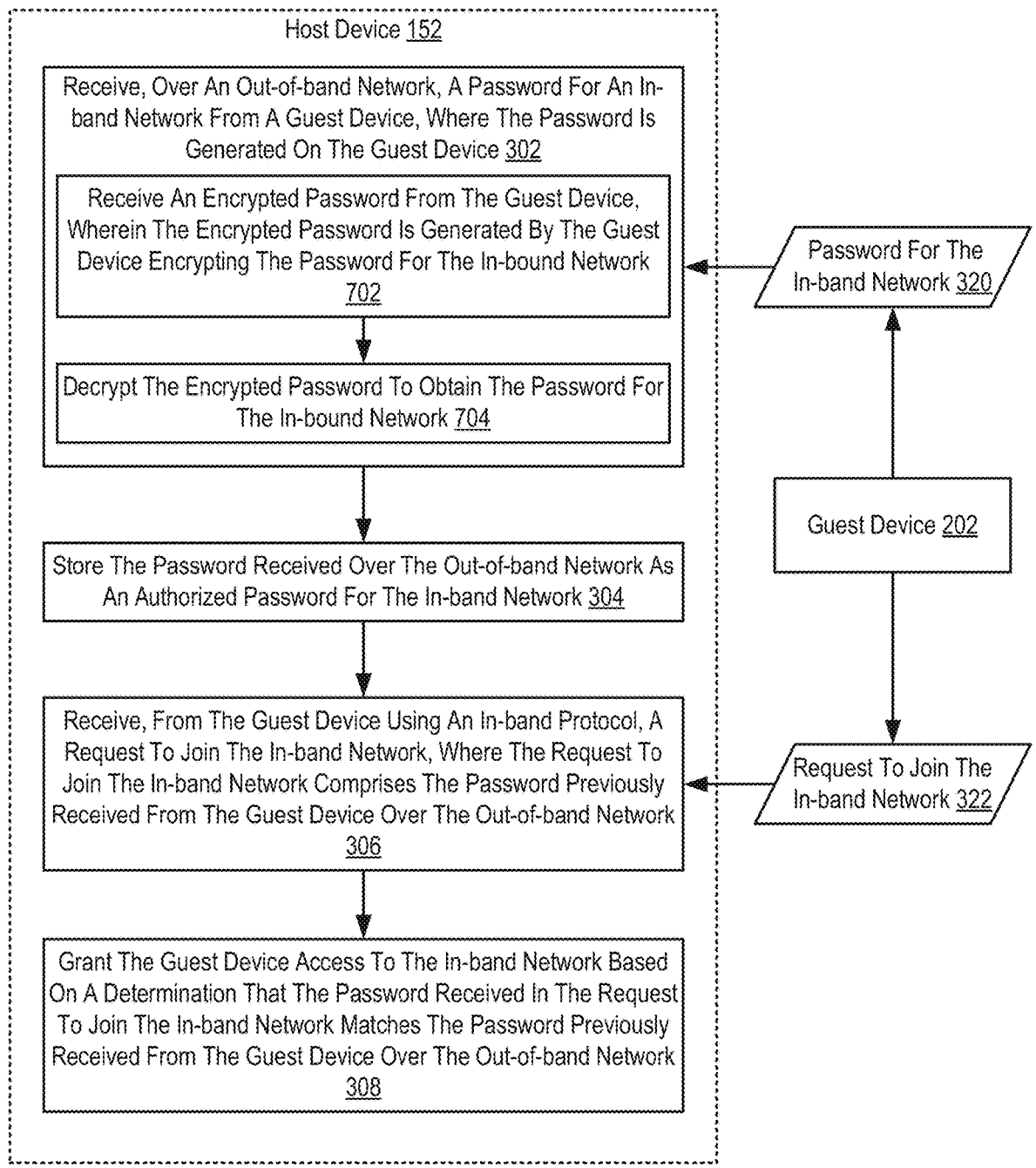
FIG. 7 sets forth a flow chart illustrating an exemplary method for granting guest devices access to a network using out-of-band authorization according to embodiments of the present invention.

For further explanation, FIG. 7 sets forth a flow chart illustrating a further exemplary method for granting guest devices access to a network using out-of-band authorization according to embodiments of the present invention that includes receiving (302), over an out-of-band network, a password (320) for an in-band network from a guest device (202), wherein the password is generated on the guest device (202); storing (304) the password (320) received over the out-of-band network as an authorized password for the in-band network; receiving (306), from the guest device (202) using an in-band protocol, a request (322) to join the in-band network, wherein the request (322) to join the in-band network comprises the password previously received from the guest device (202) over the out-of-band network; and granting (308) the guest device (202) access to the in-band network based on a determination that the password received in the request (322) to join the in-band network matches the password (320) previously received from the guest device (202) over the out-of-band network.

The method of FIG. 7 differs from the method of FIG. 3, however, in that receiving (302), over an out-of-band network, a password (320) for an in-band network from a guest device (202), wherein the password is generated on the guest device (202) includes receiving (702) an encrypted password from the guest device (202), wherein the encrypted password is generated by the guest device (202) encrypting the password for the in-band network; and decrypting (704) the encrypted password to obtain the password for the in-band network.

Receiving (702) an encrypted password from the guest device (202), wherein the encrypted password is generated by the guest device (202) encrypting the password for the in-band network may be carried out by the guest device obtaining an encryption key and applying the encryption key to the password before sending the password to the host device (152). The password (320) may be encrypted using an encryption key known to both the guest device (202) and the host device (152). Both the host device (152) and the guest device (202) may be pre-programmed with the encryption key. Alternatively, the guest device may obtain the encryption key from the host device (152) outside of the out-of-band network (or in-band network). For example, the password may be encrypted using a code printed on the host device (152) and read into the guest device (202) (e.g., automatically via a camera on the guest device).

Decrypting (704) the encrypted password to obtain the password for the in-band network may be carried out by the host device (152) using the encryption key to extract the password from the encrypted password received from the guest device (202). The decrypted password may then be stored on the host device (152) as the authorized password. The password may be send to the host device (152) as an encrypted password to frustrate an attempt to intercept the password during transmission over the out-of-band network.

In view of the explanations set forth above, readers will recognize that the benefits of granting guest devices access to a network using out-of-band authorization according to embodiments of the present invention include:

Improving the operation of a computing system by authorizing a network device based, at least in part, on that device's ability to access a second network, increasing computer system and network authentication efficiency and simplicity.

Improving the operation of a computing system by generating temporary networks for guest devices instead of providing guest devices with passwords used by long-term network devices, increasing computing system and network security.

Exemplary embodiments of the present invention are described largely in the context of a fully functional computer system for granting guest devices access to a network using out-of-band authorization. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
   receiving, by a router, over an out-of-band network, a password for connecting to an in-band network from a guest device, wherein the password is generated on the guest device, wherein the router controls access to the in-band network, wherein the in-band network is a WiFi network, and wherein the out-of-band network is one selected from a group consisting of a Bluetooth connection, a near field communication connection, and an infrared connection;

storing, by the router, the password received over the out-of-band network as an authorized password for connecting to the in-band network;
   receiving, by the router, from the guest device using an in-band protocol, a request to join the in-band network, wherein the request to join the in-band network comprises the password previously received from the guest device over the out-of-band network; and
   granting, by the router, the guest device access to the in-band network based on a determination that the password received in the request to join the in-band network matches the password previously received from the guest device over the out-of-band network.

2. The method of claim 1, further comprising: deauthorizing the authorized password for the in-band network based on one selected from a group consisting of:
   a determination that the guest device is out of range of the in-band network;
   a determination that a pre-determined period of time has elapsed with no communication from the guest device over the in-band network;
   a determination that a time period has expired; and
   a determination that an amount of data used by the guest device over the in-band network has exceeded a data threshold.

3. The method of claim 1, wherein receiving, by the router, over the out-of-band network, the password for the in-band network from the guest device comprises receiving, by the router, from the guest device over the out-of-band network, a network attributes definition for the in-band network, and
   wherein storing, by the router, the password received over the out-of-band network as the authorized password for the in-band network comprises creating, by the router, the in-band network using the network attributes definition for the in-band network received from the guest device over the out-of-band network.

4. The method of claim 3, wherein the network attributes definition for the in-band network comprises an identifier of the guest device.

5. The method of claim 1, wherein receiving, over the out-of-band network, the password for the in-band network from the guest device comprises sending a password addition to the guest device over the out-of-band network, and
   wherein storing the password received over the out-of-band network as the authorized password for the in-band network comprises storing the password and the password addition as the authorized password for the in-band network.

6. The method of claim 1, wherein receiving, over the out-of-band network, the password for the in-band network from the guest device comprises:
   receiving an encrypted password from the guest device, wherein the encrypted password is generated by the guest device encrypting the password for the in-band network; and
   decrypting the encrypted password to obtain the password for the in-band network.

7. An apparatus comprising a computing device, a computer processor, and a computer memory operatively coupled to the computer processor, the computer memory having disposed within it computer program instructions that, when executed by the computer processor, cause the apparatus to carry out the steps of:
   receiving, by a router, over an out-of-band network, a password for connecting to an in-band network from a guest device, wherein the password is generated on the guest device, wherein the router controls access to the in-band network, wherein the in-band network is a WiFi network, and wherein the out-of-band network is one selected from a group consisting of a Bluetooth connection, a near field communication connection, and an infrared connection;

storing, by the router, the password received over the out-of-band network as an authorized password for connecting to the in-band network;

receiving, by the router, from the guest device using an in-band protocol, a request to join the in-band network, wherein the request to join the in-band network comprises the password previously received from the guest device over the out-of-band network; and granting, by the router, the guest device access to the in-band network based on a determination, made by the router, that the password received in the request to join the in-band network matches the password previously received from the guest device over the out-of-band network.

8. The apparatus of claim 7, wherein the computer program instructions further cause the apparatus to carry out the step of:

deauthorizing the authorized password for the in-band network based on one selected from a group consisting of:
  a determination that the guest device is out of range of the in-band network;
  a determination that a pre-determined period of time has elapsed with no communication from the guest device over the in-band network;
  a determination that a time period has expired; and
  a determination that an amount of data used by the guest device over the in-band network has exceeded a data threshold.

9. The apparatus of claim 7, wherein receiving, by the router, over the out-of-band network, the password for the in-band network from the guest device comprises receiving, by the router, from the guest device over the out-of-band network, a network attributes definition for the in-band network, and wherein storing, by the router, the password received over the out-of-band network as the authorized password for the in-band network comprises creating, by the router, the in-band network using the network attributes definition for the in-band network received from the guest device over the out-of-band network.

10. The apparatus of claim 9, wherein the network attributes definition for the in-band network comprises an identifier of the guest device.

11. The apparatus of claim 7, wherein receiving, over the out-of-band network, the password for the in-band network from the guest device comprises sending a password addition to the guest device over the out-of-band network, and wherein storing the password received over the out-of-band network as the authorized password for the in-band network comprises storing the password and the password addition as the authorized password for the in-band network.

12. The apparatus of claim 7, wherein receiving, over the out-of-band network, the password for the in-band network from the guest device comprises:

receiving an encrypted password from the guest device, wherein the encrypted password is generated by the guest device encrypting the password for the in-band network; and decrypting the encrypted password to obtain the password for the in-band network.

13. A computer program product including a non-transitory computer readable medium, the computer program product comprising computer program instructions that, when executed, cause a computer to carry out the steps of:

receiving, by a router, over an out-of-band network, a password for connecting to an in-band network from a guest device, wherein the password is generated on the guest device, wherein the router controls access to the in-band network, wherein the in-band network is a WiFi network, and wherein the out-of-band network is one selected from a group consisting of a Bluetooth connection, a near field communication connection, and an infrared connection;

storing, by the router, the password received over the out-of-band network as an authorized password for connecting to the in-band network;

receiving, by the router, from the guest device using an in-band protocol, a request to join the in-band network, wherein the request to join the in-band network comprises the password previously received from the guest device over the out-of-band network; and granting, by the router, the guest device access to the in-band network based on a determination, made by the router, that the password received in the request to join the in-band network matches the password previously received from the guest device over the out-of-band network.

14. The computer program product of claim 13, wherein the computer program instructions further cause the computer to carry out the step of:

deauthorizing the authorized password for the in-band network based on one selected from a group consisting of:
  a determination that the guest device is out of range of the in-band network;
  a determination that a pre-determined period of time has elapsed with no communication from the guest device over the in-band network;
  a determination that a time period has expired; and
  a determination that an amount of data used by the guest device over the in-band network has exceeded a data threshold.

15. The computer program product of claim 13, wherein receiving, by the router, over the out-of-band network, the password for the in-band network from the guest device comprises receiving, by the router, from the guest device over the out-of-band network, a network attributes definition for the in-band network, and wherein storing, by the router, the password received over the out-of-band network as the authorized password for the in-band network comprises creating, by the router, the in-band network using the network attributes definition for the in-band network received from the guest device over the out-of-band network.

16. The computer program product of claim 15, wherein the network attributes definition for the in-band network comprises an identifier of the guest device.

17. The computer program product of claim 13, wherein receiving, over the out-of-band network, the password for the in-band network from the guest device comprises sending a password addition to the guest device over the out-of-band network, and wherein storing the password received over the out-of-band network as the authorized password for the in-band network comprises storing the password and the password addition as the authorized password for the in-band network.

18. The computer program product of claim 13, wherein receiving, over the out-of-band network, the password for the in-band network from the guest device comprises:
receiving an encrypted password from the guest device, wherein the encrypted password is generated by the guest device encrypting the password for the in-band network; and
decrypting the encrypted password to obtain the password for the in-band network.

\* \* \* \* \*